United States Patent [19]
Giehler

[11] 3,891,370
[45] June 24, 1975

[54] APPARATUS FOR MAKING HOLLOW BODIES FROM THERMOPLASTIC MATERIALS BY ROTATION-MELTING

[75] Inventor: Herbert Giehler, Dautphe-Wilhelmshutte, Germany

[73] Assignee: Elkamet-Werk Lohn-Kunststoff, Biedenkopf/Lahn, Germany

[22] Filed: May 28, 1974

[21] Appl. No.: 474,006

[52] U.S. Cl. .................. 425/144; 165/27; 425/429
[51] Int. Cl. .............................................. B29c 5/04
[58] Field of Search .......... 425/143, 144, 429, 435; 165/35, 36, 27

[56] References Cited
UNITED STATES PATENTS
3,388,429   6/1968   Barnett et al. ..................... 425/144
3,454,988   7/1969   Cremer ........................... 425/435 X Primary Examiner—Robert D. Baldwin
Attorney, Agent, or Firm—Otto John Munz

[57] ABSTRACT

An apparatus for making hollow bodies from thermoplastic materials by rotation-melting, has one or several hollow molds which are to be filled partially with fluid or easily pourable plastic. The molds are composed of two mold halves and are positioned, within a frame or base for rotation about two axes being at right angles to each other. Means are provided for selective heating and cooling, during the rotation, by means of a fluid transfer agent.

7 Claims, 1 Drawing Figure

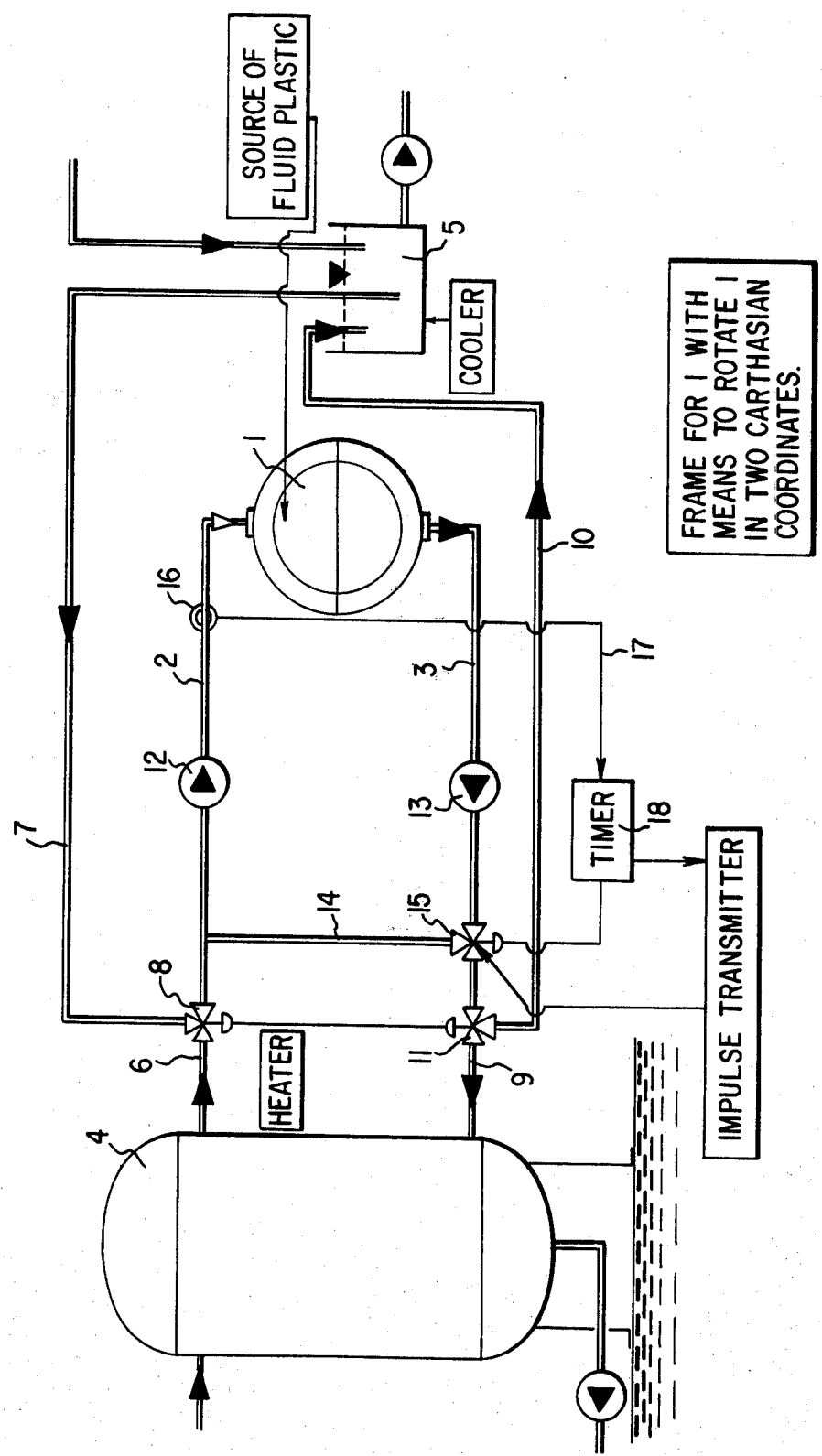

APPARATUS FOR MAKING HOLLOW BODIES FROM THERMOPLASTIC MATERIALS BY ROTATION-MELTING

DESCRIPTION OF THE PRIOR ART

In the prior art devices are known as above in which double-walled hollow molds are provided and the hollow spaces or cavities in the mold walls serve as conduits for oil to be adjusted to a specific temperature for either heating or cooling the molds.

The oil circulates in two cycles, namely in a heating cycle and in a cooling cycle, which cycles are selectively actuated over the molds, depending upon whether the molds are intended to be heated so as to melt the plastic which is to be treated or processed therein, or cooled, in order to harden the finished molded plastic object.

It is important, on the one hand, that, within the area of the molds, there is neither an excess pressure nor an underpressure in the oil streams, respectively circulated over the molds. In order to assure this, conveying devices are installed into the line of the forward movement, i.e., into the line from the oil reservoir to the molds, as well as into the line of the return movement, i.e., into the line from the molds to the oil reservoir.

On the other hand, however, it is also necessary that the temperature variations in the molds, during the heating phase as well as during the cooling phase, are kept within certain limits, according to the requirements of the materials processed in each instance.

As conveying devices centrifugal pumps are installed into the pipe line system for circulating the heating or cooling oil, respectively, through the mold walls. One pump each is installed into the heating oil forward flow, the cooling oil forward flow, the heating oil return flow, and the cooling oil return flow.

The temperature of the oil flowing through the mold walls is controlled by adjusting the reservoir temperature as required by the properties of the plastic material to be processed.

Devices heretofore known of this type are still largely imperfect and beset with disadvantages. First, an extraordinary degree of precision is necessary to achieve a sufficiently uniform output of the two pumps of each cycle concerned — forward movement and return movement —, so that the oil in the mold walls is subject neither to excess pressure nor to underpressure. As a result, the manufacture and maintenance of such an apparatus becomes very expensive, quite apart from the fact that the very multiplicity of pumps results in a substantial increase in costs. Particularly, also the susceptibility to disturbances is increased. When one pump only breaks down, the device becomes inoperative. When the disturbance or fault of the pump is located in the return movement, the damage is possibly not limited to the production or delivery stoppage of the device only. Beyond it, even damage to, or destruction of, the molds may ensue.

In order to avoid these disadvantages, a device has already been proposed, wherein, in the entire line system for passing the hot or cold oil through the mold, only a single feed pump is required. In this structure, a centrifugal pump is installed into the forward movement directly in front of the molds. The conveying capacity of this centrifugal pump is substantially greater than would be necessary for the passing of oil through the mold walls. For achieving the required pressure balance of the oil in the mold walls, one or more Venturi tubes are installed in the return movement lines, and the delivery flow of these Venturi tubes is fed by the centrifugal pump installed in the forward movement, by way of connecting lines leading to the return movement.

In order to be able to use this conveying device for the hot oil cycle as well as for the cool oil cycle, three-way valves are installed directly in front of the centrifugal pump and behind the venturi tubes, which three-way valves permit a selective switching of the lines passing through the mold walls to the hot oil cycle or the cool oil cycle.

Beyond this, there exists, however, still a substantial imperfection in the control of the temperature of the oil which is used as the heat energy carrier and flows through the mold walls. On the other hand, it is not difficult to adapt the temperatures to the plastic material processed in each case. This requires merely that the reservoir temperatures be adjusted accordingly.

Thus, however, the temperatures remain in each case constant during the entire heating phase and during the entire cooling phase and this fact has proved to be disadvantageous.

SUMMARY OF THE INVENTION

The primary object of the present invention is to improve a device for making hollow bodies from thermoplastic material by rotation-melting in the manner described above, so that the temperature variation in the oil flowing through the mold walls is controllable during the heating phase as well as during the cooling phase according to a prespecified program corresponding to the requirements of a specific plastic material, which is presently processed.

BRIEF DESCRIPTION OF THE DRAWINGS

The sole FIGURE of the drawings is a schematic representation of the device of the invention.

DESCRIPTION OF THE PREFERRED EMBODIMENTS

An apparatus for making hollow bodies from thermoplastic materials by rotation-melting comprises one or more hollow molds, each composed of two mold halves. The molds are partially filled with a fluid or easily pourable plastic material. The molds are mounted, within a frame or base, rotatably, about two axes positioned at right angles to each other.

The walls are provided with a continuous hollow chamber, or cavities, equipped with pipe connections. The molds can be heated and cooled alternatingly, during rotation, by means such as oil, which serves as a heat transfer agent and flows through the hollow spaces in the molding walls. In addition a cycle line with a reservoir for heated oil, and a cycle line with a reservoir for cooled oil, are connected to the hollow spaces in the mold walls alternatingly, each by a way of a three-way valve, in the forward flow and in the return flow. In the forward flow is interposed a centrifugal pump, and in the return flow a centrifugal pump. In the alternative, one or more venturi tubes are arranged each between the molds, hereinafter referred to also as the energy consumer, and the three-way valve of the forward flow, or, respectively, the three-way valve of the return flow. The apparatus is thus provided with a. forward flow and return flow lines connected by a mixing line which connects with the return flow line at any point between the energy consumer and the three-way valve of the return flow, and ends in the forward flow line between the centrifugal pump positioned therein, and the three-way valve of the forward flow line, in which structure a mixing valve is interposed in the mixing line;

b. on the forward flow line, at a suitable point between the energy consumer and the mouth of the mixing line in the forward flow line, a thermometer probe is provided, wherefrom an electric circuit leads to a conventional impulse transmitter. The control of the mixing valve, which operates preferably according to a program on a perforated tape, is actuated preferably by a pneumatic impulse transmitter controlled by a timer.

Suitably the mixing valve is arranged at the connecting point between the mixing line and the return line.

The apparatus comprises a rotating frame, carrying one or more molding units. Means are provided to rotate the frame with the molding units about axes disposed in two Carthasian coordinates perpendicularly to each other. In the drawings one mold is shown. It is double walled thus providing between the external and internal walls which are spaced from each other, a continuous chamber. To this chamber are connected alternatingly two flow systems, one with forward flow line 2, a hot oil tank 4, and the other with a return flow line 3 to a cool oil tank 5.

A three-way valve 8 connects the forward flow pipe 2, the pipe 6, extending from the hot oil reservoir, and the pipe 7 extending from the cool oil reservoir.

In the same manner the return flow pipe 3 with a return pipe 9 leading to the hot oil reservoir 4, and with a pipe 10 leading to the cool oil reservoir 5, connects a three-way return flow valve 11.

A centrifugal pump 12 is arranged in the forward flow pipe 2 to convey the hot or cool oil through the energy consumer consisting of one or more molds 1. In order to prevent an excess pressure in the hollow spaces of the mold walls by the resistance to the flow in the return flow pipe 3, a conveyor is also provided in the return flow pipe 3.

As described here and shown, this conveyor likewise comprises a centrifugal pump 13. In place thereof, however, a venturi tube may be provided, which receives its conveying flow from a pipe line which branches off from the forward movement. Thereby only one centrifugal pump is still necessary in the forward movement. It must, however, also supply a much greater output.

The forward flow line 2 and the return flow line 3 are connected by a mixing line 14. The latter connects from the return flow pipe 3 at a point located between the centrifugal pump 13, and the three-way return flow valve 11, and ends in forward pipe 2 at a point located between centrifugal pump 12 and the three-way forward flow valve 8. A mixing valve 15 is provided at the connecting point between the return flow pipe 3 and a mixing line 14.

At forward flow 2, between the centrifugal pump 12 and the energy consumer, a thermometer probe 16 is provided which is connected, through an electric circuit 17, to a conventional timer 18, programmed and operating according to a perforated tape. The thermometer probe controls a pneumatic impulse transmitter, which in turn controls the mixing valve 15.

The improvement according to the invention operates as follows:

A heater is provided to keep the oil temperature in the hot oil reservoir at least in the zone of discharge, at a level which corresponds to the peak demand of the energy consumer. Likewise, a cooler is provided to keep the oil in the cool oil reservoir at the necessary cooling temperature.

The centrifugal pump 12 feeds the oil in the forward flow pipe 2, from the reservoirs to the energy consumer and after discharge, by means of the centrifugal pump 13 in the return flow pipe 3, from the energy consumer into the reservoirs. Depending on the position of three-way valves 8 in the forward pipe 2, and 11 in the return pipe 3, the energy consumer is connected with the hot oil reservoir 4 during the heating and melting phase or with the cool oil reservoir 5 during the cooling and hardening phase. To prevent shockwise occurrence of temperature changes and to induce them to take place according to a prespecified curve pattern, a major or minor portion of the return flow oil is refed, by way of the mixing line 14, to the forward flow pipe 2. The amount of oil diverted from the return flow pipe 3 through the mixing line 14 into the forward flow pipe 2 is determined by a corresponding adjustment of the mixing valve 15 which is controlled by the thermometer through the pneumatic impulse transmitter. In this operation the timer 18 receives its information in turn from the thermometer probe 16 on the one hand, and from the programmed perforated tape inserted in each case.

The timer programmer is a conventional device, operated usually by an electric motor. It includes means to mount therein a premade programming control, such as a linearly progressing tape or a rotating disc.

The programming control device is provided either with perforations or protuberances which mate with voids or projections in the timer to transmit actuating impulses to an impulse transmitter. The impulse transmitter actuates the mixing valve electrically or hydraulically, in accordance with the respective equipment of the mixing valve.

What is claimed is:

1. An apparatus for producing hollow thermo-plastic bodies by rotation-melting, comprising:

a frame;

at least one mold;

said mold having double walls spaced from each other to define at least one heat exchange chamber;

means to rotate said mold about two axes in Carthasian coordinates;

a cooling tank and a heating tank for a fluid heat transfer medium;

a forward flow cycle pipe line for the heating fluid and a return flow cycle pipe line for the cooling fluid; and means to connect said cycle lines through said chamber alternatingly with said heating and cooling reservoirs;

including a three-way forward valve and forward flow pump in the forward flow cycle pipe line and a three-way return valve and a return flow conveyor in the return flow cycle pipe line;

said pump and said conveyor, each being interposed between said mold and its respective three-way valve;
a mixing line connected to said return flow line between the mold and the return flow valve and ending in the forward flow line between the centrifugal pump and its three-way valve, to connect the forward flow and the return flow lines;
a mixing valve interposed in said mixing line;
a timer programmer;
a thermometer probe interposed between the mold and the mouth of the mixing line in the forward flow line;
an electric circuitry connecting the thermometer probe with said programmer;
an impulse transmitter connected to actuate said mixing valve;
said timer-programmer connected to actuate said impulse transmitter.

2. An apparatus as claimed in claim 1, said conveyor being a venturi tube.

3. An apparatus as claimed in claim 1, said conveyor being a centrifugal pump.

4. An apparatus as claimed in claim 1, said timer-programmer including means to run it by a perforated programmed tape.

5. An apparatus as claimed in claim 1, said impulse transmitter including hydraulic means to actuate said mixing valve.

6. An apparatus as claimed in claim 1, said impulse transmitter including electric motor means to actuate said mixing valve.

7. An apparatus as claimed in claim 1, said mixing valve together with the connection with said mixing line being arranged in the return flow line between the said conveyor and the three-way return flow valve.

* * * * *

UNITED STATES PATENT OFFICE
CERTIFICATE OF CORRECTION

Patent No. 3,891,370                 Dated June 24, 1975

Inventor(s) Herbert Giehler

It is certified that error appears in the above-identified patent and that said Letters Patent are hereby corrected as shown below:

Assignee, should read -- ElKamet-Werk Lahn-Kunststoff --.

Signed and Sealed this second Day of September 1975

[SEAL]

Attest:

RUTH C. MASON
Attesting Officer

C. MARSHALL DANN
Commissioner of Patents and Trademarks